United States Patent [19]

Wong et al.

[11] Patent Number: 5,802,594
[45] Date of Patent: Sep. 1, 1998

[54] SINGLE PHASE PSEUDO-STATIC INSTRUCTION TRANSLATION LOOK-ASIDE BUFFER

[75] Inventors: Jimmy W. Wong, Portland; Badarinath Kommandur, Beaverton, both of Oreg.

[73] Assignee: Intel Corporation, Santa Clara, Calif.

[21] Appl. No.: 524,371

[22] Filed: Sep. 6, 1995

[51] Int. Cl.$^6$ .................................................. G06T 11/00
[52] U.S. Cl. ............................ 711/167; 711/156; 711/128
[58] Field of Search .................................. 395/483, 471, 395/455, 494; 711/156, 144, 128, 167; 365/49

[56] References Cited

U.S. PATENT DOCUMENTS

| | | | |
|---|---|---|---|
| 4,811,209 | 3/1989 | Rubenstein | 395/471 |
| 5,058,003 | 10/1991 | White | 395/419 |
| 5,173,872 | 12/1992 | Crawford et al. | 365/49 |
| 5,329,633 | 7/1994 | Lee et al. | 365/230.06 |
| 5,359,564 | 10/1994 | Liu et al. | 365/49 |

OTHER PUBLICATIONS

Hennessy et al., "Computer Organization and Design: The Hardware/Software Interface", Morgan Kauffman Publishers, pp. 283, 509, B-19, B-30 and B-31, 1994.

Handy, Jim, "The Cache Memory Book", Academic Press, Inc., pp. 22, 44, and 45, 1993.

Short, Kenneth L., "Microprocessors and Programmed Logic", Prentice-Hall, p. 69, section 3.2.2, 1987.

*Primary Examiner*—Tod R. Swann
*Assistant Examiner*—Felix B. Lee
*Attorney, Agent, or Firm*—Blakely, Sokoloff, Taylor & Zafman

[57] ABSTRACT

An instruction translation look-aside buffer (iTLB) for attaining very high data processing throughput comprises a $2^n$-way set associative data array having m sets, where m and n are both integers greater than or equal to one, with associated data and tag arrays. A set address selects one of the m sets for reading, resulting in a readout of all $2^n$ ways of the tag, valid and data arrays. Comparison logic determines if a match exists between the $2^n$ tags read out from the tag array with a portion of the linear address. A "hit" to a certain way causes a hit line signal to select data for the corresponding way, which is output from a $2^n$:1 static multiplexer and contains the physical address translation. Each of the hit lines are precharged during a first phase of a clock cycle. The comparison logic operating during a second phase of a clock cycle. Thus, the matching is accomplished in a single clock cycle.

27 Claims, 6 Drawing Sheets

FIG_1
(prior art)

FIG_2

FIG_3

FIG_4

FIG_5

FIG_6

FIG_7

FIG_3

FIG_4

SINGLE PHASE PSEUDO-STATIC INSTRUCTION TRANSLATION LOOK-ASIDE BUFFER

FIELD OF THE INVENTION

The present invention relates generally to the field of cache memories. More specifically, the invention relates to methods and apparatus for implementing an instruction translation look-aside buffer in a microprocessor or computer system.

BACKGROUND OF THE INVENTION

Cache memory, or simply "cache" for short, is the level in the memory hierarchy of a computer between the central processing unit (CPU) and main memory. Caches appear today in nearly every class of computer. Many computers, in fact, use more than one cache in the memory hierarchy. As is well known, cache memories make use of the spatial and temporal locality of programs, in which a data item that has been referenced once is likely to be referenced again in the near future. If a block of data can be placed in a restricted set of locations in a cache, the cache is said to be "set associative". By way of example, if there are N blocks in a set, the cache is referred to as being "n-way set associative".

A translation look-aside buffer (TLB) is a special address translation cache that is utilized in the memory hierarchy design of a computer to remedy the problem of fast address translation. Computer architects understand that a linear address must be first translated to obtain the corresponding physical address before the data can be accessed in main memory. Relying on the principle of locality, the translation look-aside buffer is a special cache that holds address translations for references that have both spatial and temporal locality. (Note that the field of computer architecture linear addresses are sometimes referred to as virtual addresses. For purposes of clarity, the present application simply uses the term "linear address"; however that term should be understood as being synonymous with a virtual address).

In modern computers, the instruction translation look-aside buffer (iTLB) functions as an intermediate buffer to cache the most recently used physical address translations in order to minimize the impact of large iTLB miss latency in fetching the translation from the secondary memory. To obtain a high throughput from the processor, it is essential to minimize the miss ratio for the iTLB, and also to reduce the access time for the iTLB. One obvious way to reduce the miss ratio is to increase the size of the iTLB; another is to increase the set associatively of the cache design. This results in the scenario of the possible data being forwarded from any one of the various ways of the cache. The resulting tag match and data multiplexing frequently results in a speed bottleneck. Overcoming this speed bottleneck has been a problem that has plagued designers. The problem is especially troublesome in superpipelined processor architectures where the target frequency of operation is extremely high (e.g., 100 MHz or greater). Attempts to overcome this problem has resulted in a variety of different cache designs.

Prior caches designs interleaved the tag array to facilitate the update of the tag array, thereby reducing routing bottlenecks that impacted speed of operation. Another common technique utilizes pass-gate or domino self-timed multiplexers within the TLB circuitry. The drawback of employing such multiplexer circuitry, however, is that they commonly cause a problem known as "way multiplexing contention" wherein data from multiple ways contend for the output.

Figure 1:
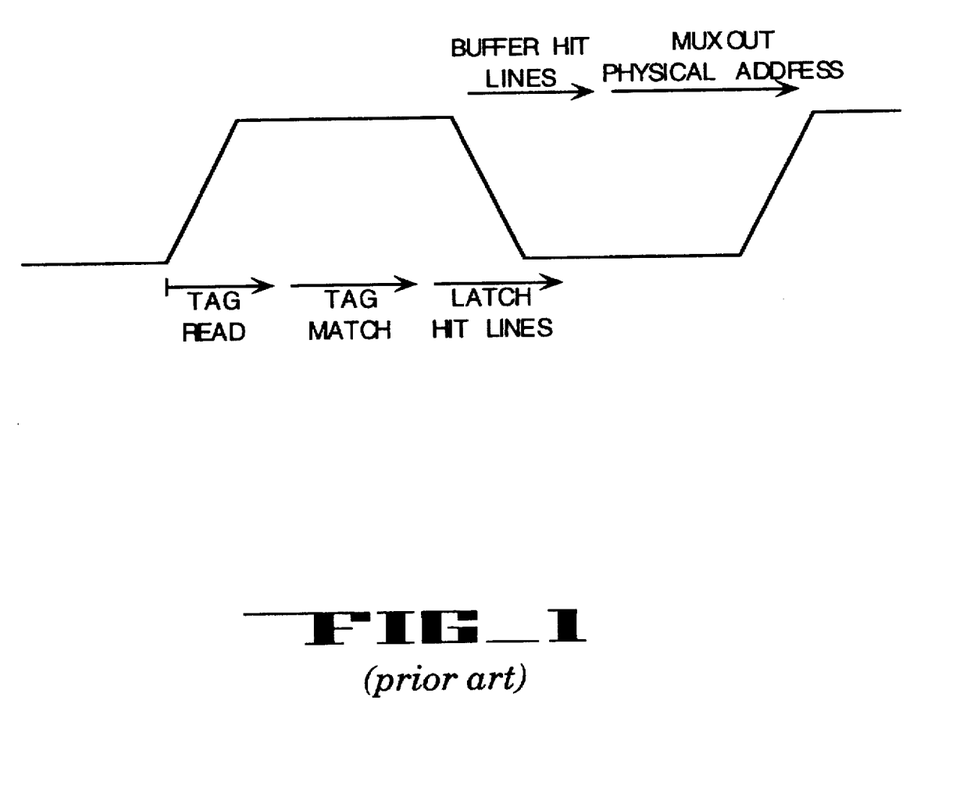
FIG. 1 is a timing diagram showing various cache operations for a previous architecture.

Other design approaches have spread out the access to the TLB over several clock phases. Many previous cache designs used an entire clock cycle for iTLB lookup. An example is shown in the event timing diagram of FIG. 1. In such an architecture the iTLB is accessed during a first cycle, by first reading the tag, matching the tag, and then latching the appropriate hit lines. The correct address is multiplexed out in the following clock cycle.

Although these design techniques have been useful, it has still proven difficult to self-time the circuitry within the TLB to more rapidly multiplex out the data. A primary reason why fast TLB designs remain problematic is because in order to have data forwarded from one of the multiple ways, the correct way must be known in advance of the multiplexing operations. For this reason, in cache systems having more than two ways, practitioners typically have either employed complicated self-timed circuitry or stretched the accesses over several clock cycles.

As will be seen, the present invention offers a simple, but elegant, iTLB architecture in which data is forwarded in a multi-way cache in a single clock phase. The present invention achieves this astounding result without the use of self-timed circuitry or pass-gate multiplexers.

SUMMARY OF THE INVENTION

The present invention is an instruction translation look-aside buffer (iTLB) for attaining very high data processing throughput. The basic concepts of the inventive iTLB are also useful in general memory applications where it is desired to forward data from a n-way set associative cache in a single clock phase. Otherwise stated the inventive cache design provides a data output in a totally asynchronous manner. Once a linear address is presented at an input clock edge the data is provided at the output prior to the next clock edge transition.

In one embodiment, the iTLB of the present invention comprises a $2^n$-way set associative data array having m sets, where m and n are both integers greater than or equal to one. Each entry in the array holds a physical address. Associated with the data array is a tag array that stores tags, and a valid array which stores a pair of valid bits; entries in each of these arrays hold information which corresponds to entries in the data array. A j-bit portion of a linear address comprises a set address that is used to select one of the m sets for reading. All $2^n$ ways of the tag, valid and data arrays are immediately read out in response to the set address.

The iTLB further includes logic means for comparing the $2^n$ tags read out from the tag array with a k-bit portion of the linear address. If a match exists to a certain way, and at least one of the corresponding valid bits is set, the logic means generates a hit signal corresponding to that way. The hit signal functions as the selection input of a $2^n:1$ static multiplexer. The static multiplexer is coupled to the data array such that the data for the correct way is output to the instruction fetch unit of the processor as soon as the way selection occurs. The data output of the static multiplexer, of course, contains the physical address translation for the linear address of the instruction to be fetched.

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

FIG. 8 is a circuit schematic diagram of a portion of the comparator circuitry of one embodiment of the present invention.

FIG. 9 illustrates another portion of the comparator circuitry used in one embodiment of the present invention.

DETAILED DESCRIPTION

Figure 2:
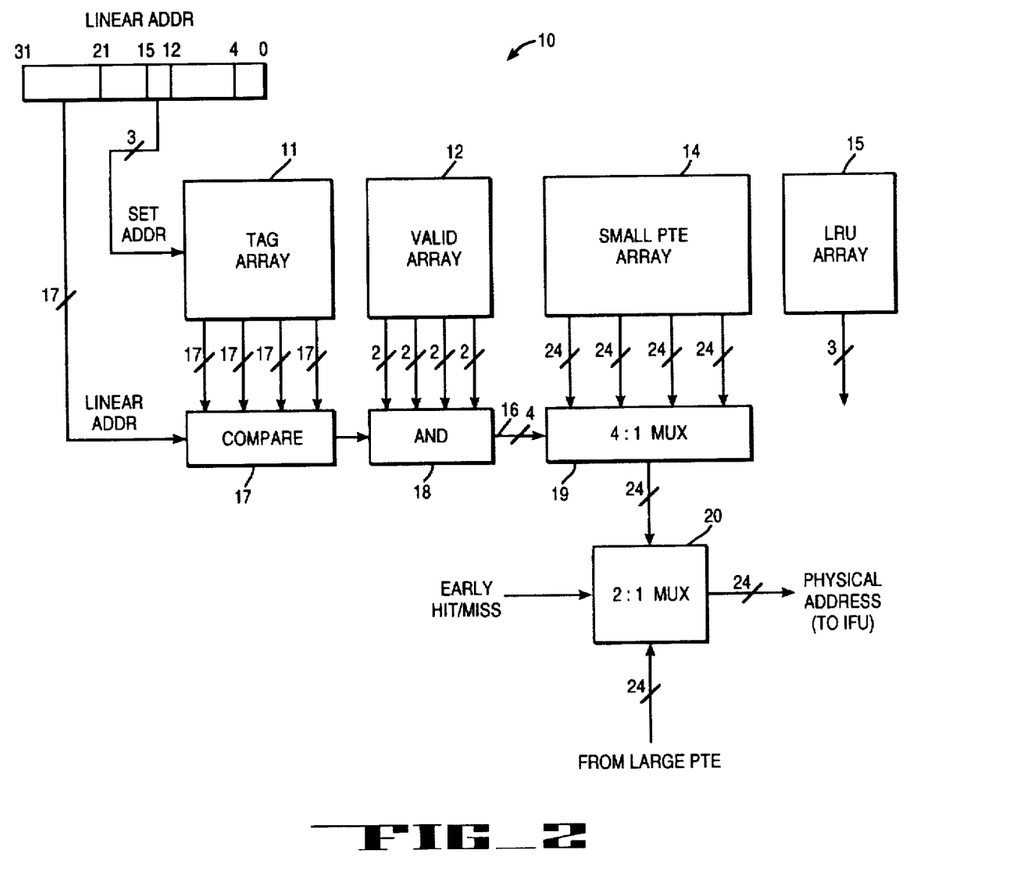
FIG. 2 is a block diagram illustrating the architecture of the present invention.

Referring to FIG. 2, there is shown a functional block diagram of the instruction translation look-aside buffer 10 of one embodiment of the present invention. Because the iTLB is a physical cache, its primary function is to cache the linear-to-physical translation of addresses and to provide those addresses on an iTLB hit to the instruction fetch unit of a microprocessor. This avoids wasting time to access external memory to fetch the translation every time a program branches to a different page in memory.

To speed up the linear-to-physical translations when paging is enabled, iTLB 10 caches the most recently used page table entries (PTEs) obtained from the page miss handler unit of the processor. Each PTE contains two pieces of information: the base or the starting physical address of the page, commonly referred to as the page frame address, and the page attribute bits that describes the characteristics of that particular page. For instance, the page attribute bits might indicate whether the page is user or supervisor accessible, or whether the page is cacheable.

The block diagram of iTLB 10 comprises a small page table entry (PTE) array 14 and a large page entry (not shown). Small page array 14 caches PTEs for pages of size 4K, while the large page array caches one single PTE for a larger page. An instruction fetch causes both of these arrays to be searched in parallel.

In the embodiment of FIG. 2, small page array 14 is a 4-way set associative cache with 8 sets for a total of 32 entries. The iTLB 10 also includes a tag array 11 which holds 17-bit linear addresses corresponding to the entries in array 14. The linear page frame address is twenty bits wide (for 4K pages) with the lower three bits of the linear page frame address being used to select one of the 8 sets in small page array 14. The lower three bits are actually decoded in a 3:8 decoder to activate a wordline which reads out all of the four ways of tag array 11, valid array 12 and small page array 14.

Valid bit array 12 contains two valid bits for each tag entry in small page array 14. The two valid bits comprise a V bit and a G bit. Both the V and G bits are cleared when the iTLB is reset. The G bit is a global valid bit and is obtained from the page miss handler along with the PTE. The V bit is set when the entry is written from the iTLB fill buffer. It is appreciated, that the use of the two valid bits is specific to the embodiment shown in FIG. 1; that is, other embodiments may only utilize one valid bit or may implement other schemes.

As discussed previously, small PTE array 14 is where the physical page frame address and page attributes are held. In one implementation, small PTE array 14 is a 32-bit wide array that accommodates a 24-bit physical page frame address, with three bits for the memory type associated with the page (e.g., uncacheable, etc.) and a user bit U. Also shown in FIG. 2 is a least recently used (LRU) array 15. Each set in small page array 14 has three associated LRU bits that track the least recently used entry in that set. The LRU bits are updated on hits in small page array 14 and on writes to the small page array from the fill buffer. LRU array 15 is also considered an optional feature of the basic architecture of the present invention In a preferred embodiment, iTLB 10 is implemented in a pipelined microprocessor architecture. Small page array 14 is read in a single stage of the pipeline beginning with bits 12–14 of the current linear fetch address being used to select one of 8 sets for reading. A 3:8 decoder activates a wordline to read out all four ways of the tag array 11, valid array 12, and PTE array 14. As shown, the upper 17-bits of the current linear fetch address are then compared with the four tags read out from the tag array. This comparison takes place within compare logic block 17. If one of the four tag compares results in a match, and either the G or the V bit is set with corresponding entry in valid array 12 (denoted by AND block 18) then a hit in small page array 14 is reported.

With continuing reference to FIG. 2, when a hit is reported to one of the four ways, a single one of the four hit lines 16 remains activated. The activated hit line 16 selects the physical address (24-bits) and the memory type (3-bits) from the corresponding way read out of array 14 for forwarding to the instruction fetch unit (IFU) of the microprocessor. The three LRU bits are used to determine which of the four ways or entries to replace if there is an iTLB miss to a set that has all four ways valid. Note that the LRU bits are updated on every iTLB hit and on every iTLB update.

The large page entry (not shown) is similar to an entry in small page array 14; the only difference for the embodiment of FIG. 2 being its tag is only 11-bits wide. Like small page array 14, the large page entry is read in the same pipe stage as the small page array. For a large page, the upper bits of the current linear fetch address are compared with the tag of the large page array. If there is a match, a hit in the large page entry signaled in the PTE contained in the entry is forwarded to the IFU. If the hit occurs in both small page array 14 and the large page entry, the PTE from the large page entry is chosen for forwarding to the IFU. An ordinary 2:1 multiplexer 20 forwards the PTE from either small page array 14 or the large page entry.

One of the salient features of the present invention is that all of the aforementioned events essentially occurs within the same phase of a single clock cycle without the use of pass-gate multiplexers with self-timed circuitry. To achieve this remarkable result, the hit lines are precharged high in order to enable the data path to be skewed in one direction, thereby speeding iTLB access time. Faster access time, of course, enable a higher frequency of operation for the microprocessor.

The precharged hit lines control the 4:1 static way multiplexer 19. In the case of multiple tag matches, limitations of possible silicon failure which are usually encountered in conventional designs are overcome in the present invention by precharging the hit lines, and further by the implementation of a fully static multiplexer 19. The static multiplexer 19 overcomes prior art limitations associated with pass gate multiplexers having self-timed circuitry.

Furthermore, since an iTLB access is performed in the high phase of the single clock cycle, the low phase of the same cycle is used to precharge the bit lines of array 14 and the hit lines input to multiplexer 19. In addition, inputs to the dynamic comparison circuitry 17 are precharged to a low state during the precharge cycle (clock low phase). This is achieved by the use of dual rail logic signals which are available in the form of BIT and BIT# lines from the tag array. This feature of the invention obviates the need to generate synchronizing signals to track tag matching. In the case of a mismatch in any one bit of the tag, the precharged hit lines will discharge in the high phase.

Figure 4:
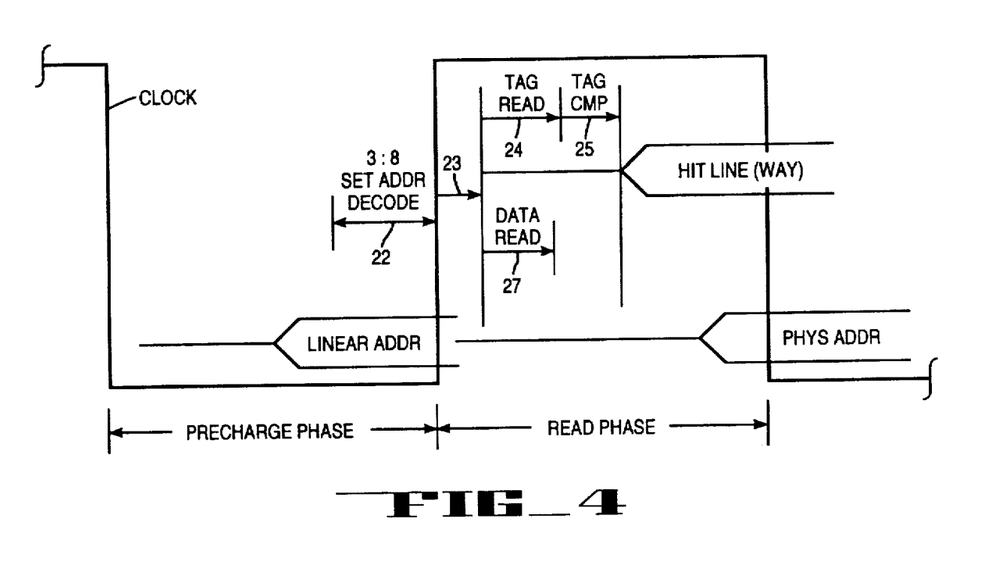
FIG. 4 illustrates the timing relationships of various operations and steps performed in an address translation in accordance with one embodiment of the present invention.

The basic read timing of the iTLB tag and data arrays is illustrated in FIG. 4. The timing events shown in FIG. 4 are divided into two phases of a single clock cycle. These two phases are the precharge phase followed by the read phase. As discussed above, during the precharge phase the bit lines of the data array and hit lines coupled to way multiplexer 19 are precharged high. When a current linear fetch address is presented to iTLB 10, a set-up time 22 is needed to enable a 3:8 set address decode to complete before the rising edge of the clock signal. This set-up time allows the wordline of the iTLB memory array to commence accessing the tag and data arrays at the beginning of the read phase, as shown in FIG. 4.

At the rising edge of the clock read phase cycle, all four ways of tag array 11 (which caches the linear address) and all four ways of small PTE array 14 (which caches the physical address) are accessed simultaneously by the decoded wordline. Note that time interval 23 represents the decoder driver time for activating the appropriate wordlines in the respective arrays. Tag read interval 24 and data read interval 27 commence simultaneously. (A similar comparison occurs in valid array 12, but is not shown in FIG. 4 for clarity). The tag comparison happens during time interval 25. Prior to the time that the tag comparison completes, the physical address information read out from data array 14 is already coupled to the inputs of 4:1 way multiplexer 19. The result of the tag comparison is a set of four hit lines 16 (see FIG. 2) that are applied to 4:1 way multiplexer 19 to select the physical address for the corresponding way that matches the tag.

Figure 3:
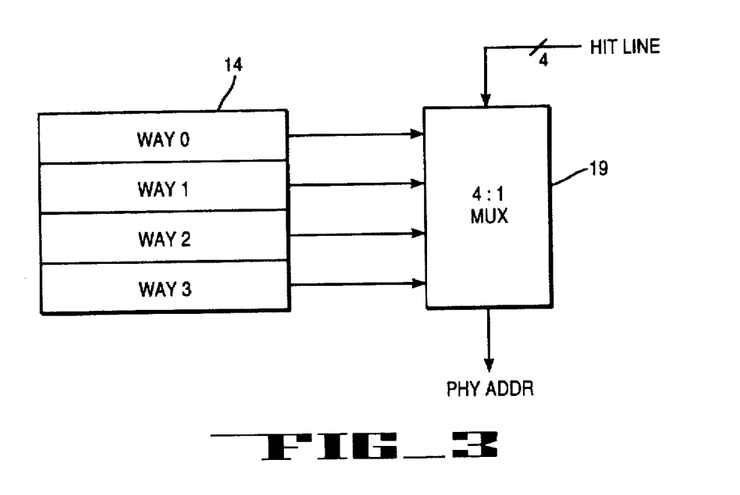
FIG. 3 illustrates the interleaving approach employed in the data array portion of the translation look-aside buffer for one embodiment of the present invention.

Of the four hit lines, only one is active high, with the remaining three hit lines discharged low. Early hit and early miss signals represent a hit/miss in the large page entry and are used to control 2:1 multiplexer latch 20. Multiplexer 20 drives the physical tag to the instruction fetch unit circuitry in one implementation of the present invention. So, from the timing perspective of FIG. 3, once the correct way is determined after tag comparison all that remains is for the data to flow through multiplexers 19 and 20 to provide the physical address before the beginning of the next clock cycle.

The physical structure of the iTLB of the present invention is organized in one implementation to minimize physical address routing from the iTLB to the processors instruction cache tag comparators. Accordingly, the tag (linear address) array 11 is divided into four non-interleaved banks, and the data (physical address) array 14 is divided into four interleaved banks. The tag arrays are not interleaved to keep the domino node of the comparator circuitry localized, since the iTLB access is intended to be complete within a single phase.

Contrary to the structure of the tag array, data array 14 is way-interleaved to avoid routing bottlenecks due to multiplexing four sets of 24-bit wide physical address busses. Interleaving of data array 14 is shown conceptually in FIG. 3. The interleaved data array is localized with static multiplexer 19 such that the individual memory cells are stacked to occupy substantially the same height dimension as multiplexer circuitry 19.

Figure 5:
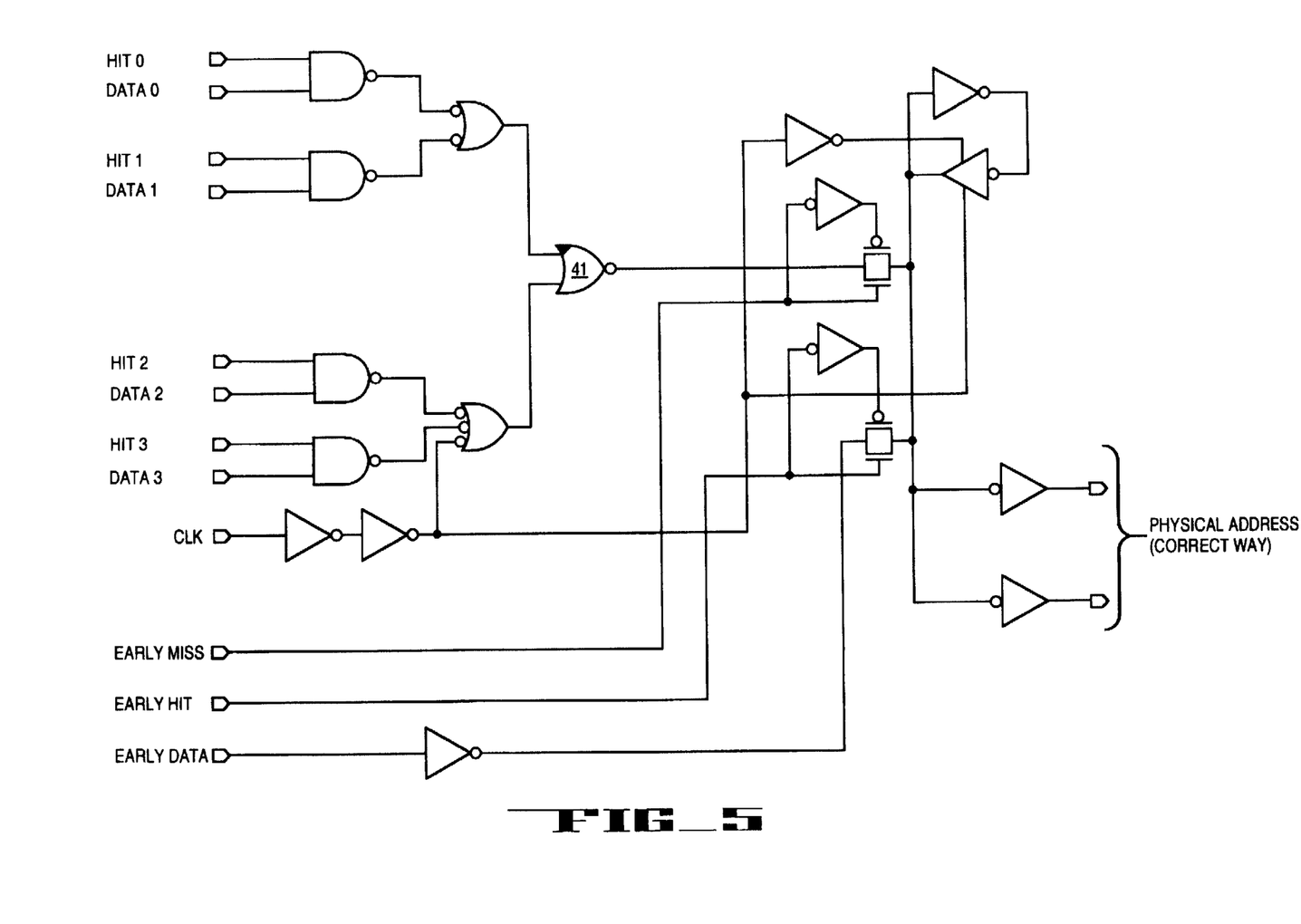
FIG. 5 shows a logic diagram of the static multiplexer utilized in one embodiment of the present invention.

FIG. 5 is a logic block diagram of the 4:1 static multiplexer utilized in the iTLB of the present invention. Practitioners of ordinary skill will recognize that multiplexer 19 may be implemented using ordinary NAND-NOR type logic gates. This multiplexer implementation, however, is contrary to conventional iTLB multiplexers which instead rely upon classic pass-gate (i.e., pn-pair) MUX circuitry. Multiplexer 19 provides a skewed data path with lower area/ power due to less switching capacitance. The advantage of the multiplexer circuit of FIG. 5 is that it solves the inherent problem of MUX contention that arises in conventional cache designs. Contention is eliminated when selecting a way by discharging all but one of the hit lines coupled to MUX 19.

Basically, static multiplexer 19 implements the following Boolean expression:

$$Y=(HIT_0*DATA_0)+(HIT_1*DATA_1)+(HIT_2*DATA_2)+(HIT_3*DATA_3)$$

where $HIT_{0-3}$ represent the four different way hit lines and $DATA_{0-3}$ represents the data output from the array for each of the ways. The clock (CLK) signal speeds up the precharge data path since the other path is skewed for test data multiplexing through the small page multiplexer. The precharge path starts upon the falling edge of CLK.

Another novel aspect of the static multiplexer employed in the present invention is the use of a BiNMOS NOR gate 41. The advantage of BiNMOS gate 41 is that it gains additional speed by virtue of its lower output capacitance for a given drive capability, as compared to an ordinary CMOS gate. The input capacitance is also lower in comparison to a CMOS stage. This enables the previous stages to be faster as the driven load is reduced.

With further reference to FIG. 5, the Early Hit signal is the result of hit logic for the large page comparator, with Early Miss being the complement of Early Hit. It should be understood that Early data is the physical address from the large page entry to be forwarded in the event there is a hit in the large entry.

It should also be understood that the purpose of the CLK signal in FIG. 5 is not for synchronization. Rather, CLK is utilized to speed up the precharge path as the evaluate path is skewed to enable a fast iTLB access time. Also note that CLK is used in FIG. 8 to precharge the domino comparator in the low phase.

Figure 6:
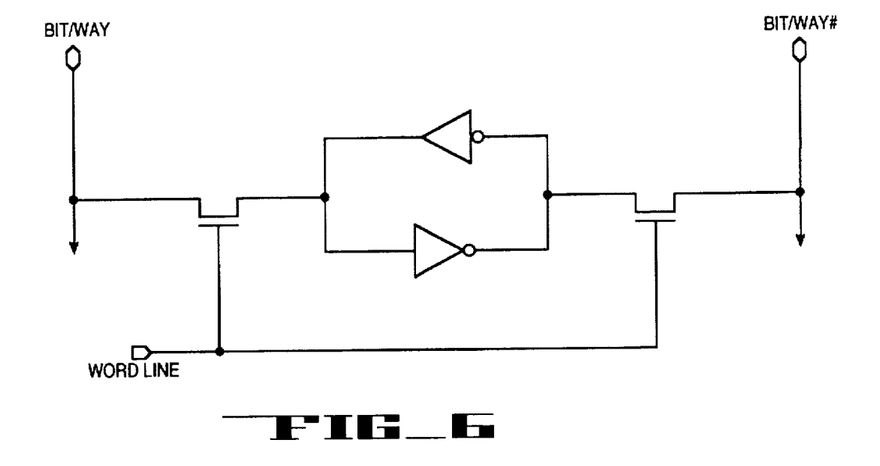
FIG. 6 is a circuit schematic of one embodiment of a data memory cell utilized in conjunction with the present invention.

FIG. 6 illustrates the six transistor SRAM memory cell utilized in both the tag and data arrays of the present invention. The memory cell design shown in FIG. 6 achieves a bigger bit line development rate and is amplified by a skewed inverter approach. A typical inverter ratio for equal rise and fall times is in the range of p/n=2.0–3.0, although it should be understood that such numbers are extremely process dependent.

Use of skewed inverter sensing instead of analog differential sensing, which is commonly used in previous TLB architectures due to short bit lines, achieves higher density layout and lower power consumption in the present invention. As discussed above, the cell pitch of memory cell shown in FIG. 6 is interleaved in the data array 14. The bit lines are precharged to the full operating supply potential ($V_{cc}$) due to the sensing inverter being a high skewed gate.

Figure 7:
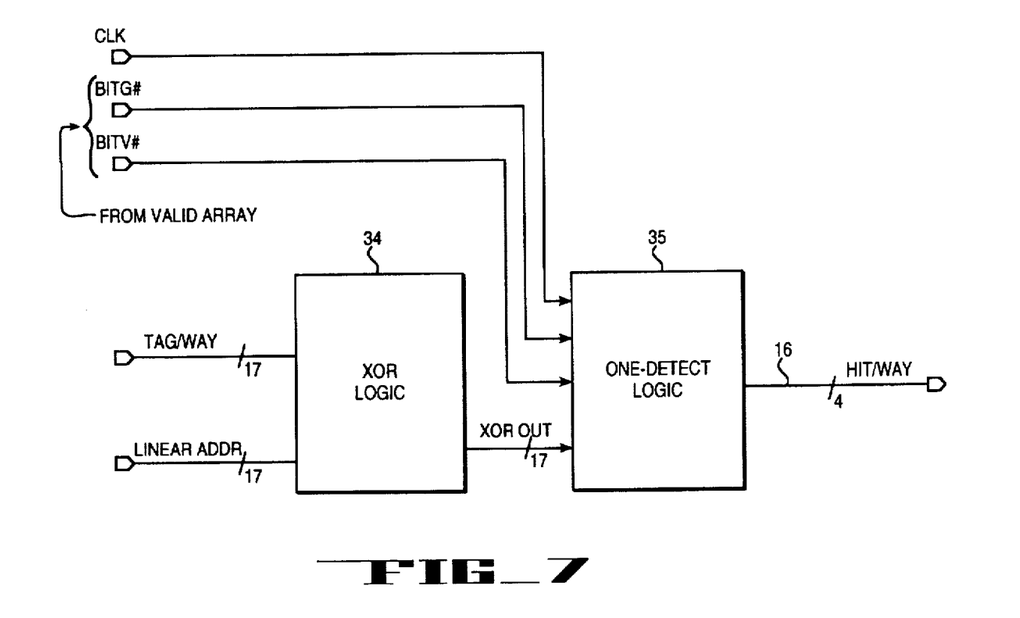
FIG. 7 is a block diagram of the comparator circuitry used in one embodiment of the present invention.

The comparator design utilized in the present invention is shown in block diagram form in FIG. 7. The individual blocks which comprise exclusive OR (XOR) and NOR logic circuitry are shown in FIGS. 9 and 8, respectively. Note that in FIG. 8, the output signal SMHITWAYL represents the domino hit line (precharged high) used to multiplex out the physical address information from the four small page entries. Additionally, the hit lines are latched so as to update the LRU array in the low phase of the clock, as provided by output signal SMHITWAYH#.

Address comparator 17 associated with small page array 14 is implemented in the two levels of logic shown in FIGS. 8 and 9. The 17-bit linear address read out from tag array 11 in the high phase of the clock cycle is immediately XORed with the current linear fetch address. The output of the XOR gates feed directly into a 17-bit dynamic 1-detect circuit which is precharged during the previous low clock phase of the clock cycle to indicate an address match. The 1-detect circuitry evaluates in the high phase of the clock cycle to indicate an address miss match. The 1-detect circuitry is essentially a 17-bit wired NOR logic.

There are a total of four of the dynamic comparators, associated with the four banks of tag array 11. The output of each dynamic comparator is the hit line that controls way multiplexer 19. Basically, all the hit lines of iTLB 10 start off high during the precharge phase. The dynamic 1-detect circuitry combined with the XOR circuitry implemented in compare block 17 and driven by the skewed inverter sense amplifier directly off the bit lines provides the advantage of obviating the need for synchronization pulses and self-timed structures.

An 11-bit linear address comparator is also associated with the large page entry and implemented in two levels of logic comprising a static XNOR gate followed by an 11-bit all ones dynamic NAND detection circuitry.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which themselves recite only those features regarded as essential to the invention.

We claim:

1. An instruction translation look-aside buffer (iTLB) comprising:

a $2^n$-way set associative data array having m sets, where m and n are both integers greater than or equal to one, each entry in the array holding a physical address;

a tag array storing tags corresponding to entries in the data array;

a valid array storing one or more valid bits for each tag in the tag array; a j-bit portion of a linear address selecting one of the m sets for reading, with all $2^n$ ways of the tag, valid and data arrays being read out in response thereto;

compare logic that compares the $2^n$ tags read out from the tag array with a k-bit portion of the linear address, the compare logic determining whether the one or more valid bits corresponding to the $2^n$ tags is set, if a match exists for a certain way, and at least one of the one or more valid bits of the certain way is set, the compare logic providing a hit line signal corresponding to the certain way;

a static multiplexer coupled to the data array and the compare logic, the multiplexer selecting a physical address from the data array which corresponds to the certain way in response to the hit line signal; and precharging circuitry that precharges the data array and the hit line during a first phase of a clock cycle prior to making the match, the match and a selection of the physical address being made in a second phase of the clock cycle, thereby completing the selection in a single clock cycle.

2. The iTLB of claim 1 wherein n=2 and m=8.

3. The iTLB of claim 2 wherein j=3 and k=17.

4. The iTLB of claim 1 wherein the static multiplexer comprises a $2^n$:1 multiplexer.

5. The iTLB of claim 1, 2, 3 or 4 wherein the compare logic comprises a plurality of exclusive-OR (XOR) gates, each XOR gate comparing a bit of the linear address with a corresponding bit of one of the tags read out from the tag array.

6. The iTLB of claim 5 wherein the compare logic further comprises dynamic one-detect circuitry coupled to the output of the XOR gates, the one-detect circuitry having $2^n$ hit line outputs comprising the hit line signal.

7. The iTLB of claim 6 wherein the precharging circuitry precharges the data array and the $2^n$ hit line outputs during a first phase of a clock cycle.

8. The iTLB of claim 7 wherein all but one of the $2^n$ hit lines discharge to select the physical address in a same phase of the clock cycle.

9. A translation buffer for rapid address translation of instructions in a computer system comprising:

a page array which caches physical page table entries (PTEs), the page table being organizes as a n-way set associative cache with m sets;

a tag array storing a tag for each entry in the page array which holds a portion of a linear address;

a valid array storing a valid bit for each PTE, a set valid bit indicating that a PTE has a valid address;

a decoder which selects one of the m sets by activating a word line coupled to the page, tag and valid arrays in response to a j-bit portion of a current linear address, all n ways being outputted by the page, tag and valid arrays;

comparison circuitry which compares the n tags output by the tag array with a k-bit portion of the current linear address, the comparison circuitry providing a hit signal on a hit line to a way if a match occurs and the corresponding valid bit is set;

a n:1 static multiplexer coupled to the page array and the comparison circuitry, the static multiplexer selecting a physical PTE output by the page array which corresponds to the way indicated by the hit signal; and precharging circuitry that precharges the data array and the hit line during a first phase of a clock cycle of the computer system cycle prior to making the match, the match and a selection of the physical PTE output being made in a second phase of the clock cycle, thereby completing the selection in a single clock cycle.

10. The translation buffer of claim 9 wherein the hit signal comprises n hit lines with all but one hit line being deactivated.

11. The translation buffer of claim 10 wherein the comparison circuitry comprises a plurality of exclusive-OR gates (XOR) each XOR gate comparing a bit of the current linear address with a corresponding bit of one of the tags read out of the tag array.

12. The translation buffer of claim 11 wherein the comparison circuitry further comprises wired-NOR logic having inputs coupled to the outputs of the XOR gates, the wired-NOR logic having n outputs wherein each output is coupled to a corresponding one of the n hit lines.

13. The translation buffer of claim 9 wherein the page array is interleaved.

14. The translation buffer of claim 13 wherein the tag array is non-interleaved.

15. The translation buffer of claim 9 wherein the page array comprises a small page array and a large page array, the translation buffer further comprising a selection circuitry that selects between the large and the small page arrays to output the physical PTE.

16. The translation buffer of claim 15 wherein the valid array stores first and second valid bits for each PTE.

17. The translation buffer of claim 9, 10, 11, 12, 13, 14, 15 or 16 wherein the precharging circuitry precharges the data array and the n hit lines during a first phase of a clock cycle of the computer system.

18. The translation buffer of claim 17 wherein the hit signal is provided in the second phase of the clock cycle of the computer system.

19. The translation buffer of claim 18 wherein n=4 and m=8.

20. In a microprocessor, a method of translating linear to physical addresses in a single clock cycle comprising the steps of:

(a) selecting a set in a n-way set associative instruction translation buffer having m sets;

(b) reading out tag, valid bit, and physical address information for all n-ways of the set from the translation buffer;

(c) performing a comparison of a current linear address with the n tags read out of the translation buffer to obtain a match indicating a hit to a certain way;

(d) providing n hit lines to a multiplexer, only one of the n hit lines being active to select one of the n physical addresses read out of the translation buffer in correspondence with the certain way;

(e) precharging the translation buffer and the n hit lines during a first phase of a clock cycle prior to performing the comparison, and performing the comparison and activating the hit line during a second phase of the clock cycle, thereby completing the translating of the linear to the physical addresses in a single clock cycle.

21. The method of claim 20 wherein steps (a) and (b) occur during the first phase of the single clock cycle.

22. The method of claim 21 wherein step (a) comprises the step of decoding a j-bit portion of the current linear address to activate a word line in the translation buffer.

23. The method of claim 22 wherein the decoding step occurs during the first phase of the single clock cycle.

24. The method of claim 21 wherein steps (c) and (d) and (e) occur during the second phase of the single clock cycle.

25. The method of claim 24 wherein step (c) comprises the steps of:

logically exclusive-ORing (XORing) bits of the current linear address with corresponding bits of each of the n tags to generate n sets of XOR outputs;

logically NORing the XOR outputs of each of the n sets to detect the match.

26. The method of claim 25 wherein step (c) further comprises the step of:

logically ANDing the match with the valid bit information corresponding to the certain way.

27. The method of claim 21, 22, 23, 24, 25 or 26 further comprising the step:

forwarding the one of the physical addresses to an instruction fetch unit of the microprocessor.

* * * * *